United States Patent

[11] 3,574,337

[72] Inventors Ralph W. Edwards
Bellbrook;
Harry Kronson, Jr., Kettering, Ohio
[21] Appl. No. 834,042
[22] Filed June 17, 1969
[45] Patented Apr. 13, 1971
[73] Assignee General Motors Corporation
Detroit, Mich.

[54] WINDSHIELD AND HEADLAMP WASHER SYSTEM
3 Claims, 5 Drawing Figs.

[52] U.S. Cl. .................................................. 239/284
[51] Int. Cl. .................................................. B05b 1/10
[50] Field of Search .......................................... 240/7.1;
239/284; 15/250.01; 134/6, 34, 42

[56] References Cited
UNITED STATES PATENTS
3,295,004 12/1966 Hirsch ........................ 239/284X
3,423,025 1/1969 Rodger ........................ 239/284

Primary Examiner—Lloyd L. King
Attorneys—W. E. Finken and W. A. Schuetz

ABSTRACT: In a preferred form, a washer system for supplying washer fluid under pressure to either a windshield or a plurality of headlamps of an automotive vehicle is disclosed. The washer system includes a source of washer fluid, a washer pump in communication with the source for delivering washer fluid under pressure, when energized, a diverter valve mechanism having inlet means in communication with the washer pump and first and second outlet means, and windshield and headlamp nozzles adapted to be positioned adjacent the windshield and the headlamps and in communication with the first and second outlet means of the diverter valve mechanism, respectively. The diverter valve mechanism includes a solenoid operated valve member having a normal position in which it directs the washer fluid toward the windshield nozzles and a retracted position, when energized by a manual control means operated by the operator of the vehicle, in which it directs the washer fluid to the headlamp nozzles of the vehicle.

INVENTORS
Ralph W. Edwards &
Harry Kronson Jr.

PATENTED APR 13 1971

INVENTORS
Ralph W. Edwards &
BY Harry Kronson Jr.

W.A. Schutz
ATTORNEY

WINDSHIELD AND HEADLAMP WASHER SYSTEM

The present invention relates to a washer system for supplying washer fluid under pressure to either first or second transparent surface areas of an automotive vehicle, and more particularly to a washer system which is selectively operable to supply washer fluid either to a windshield or a plurality of headlamps of an automotive vehicle to respectively remove vision and illumination obscuring material therefrom.

A general object of the present invention is to provide a new and improved washer system for supplying washer fluid under pressure to either first or second transparent surface areas of an automotive vehicle and which includes a diverter valve mechanism which is selectively operable by an operator of the vehicle for selectively directing the washer fluid from a single pump means to either the first or second transparent surface areas.

Another object of the present invention is to provide a new and improved washer system for supplying washer fluid under pressure to either a windshield or a plurality of headlamps of an automotive vehicle and which includes a diverter valve mechanism which is selectively operable to direct the washer fluid from a single pump means to either the windshield or the headlamps of the vehicle.

Yet another object of the present invention is to provide a new and improved washer system for supplying washer fluid under pressure to either a windshield or a plurality of headlamps of an automotive vehicle and which includes a programmed washer pump assembly for intermittently delivering squirts of washer fluid for a predetermined time interval and a diverter valve mechanism downstream of the pump and which is operable to deliver the washer fluid to the windshield when deenergized and to deliver the waSher fluid to the headlamps when energized, energization and deenergization of the diverter valve mechanism being under the control of the operator of the vehicle.

In the preferred embodiment, the washer system for supplying washer fluid to either the windshield or the headlamps of the vehicle comprises a programmed washer pump assembly which is operable when momentarily energized to intermittently deliver a predetermined number of squirts of washer fluid and then automatically shuts off, and a diverter valve mechanism downstream of the pump and which is selectively operable to either direct the washer fluid toward the windshield or toward the headlamps of the vehicle when deenergized and energized, respectively. Initiation of pump operation and energization and deenergization of the diverter valve mechanism is controlled by a momentary push button switch. When the push button switch is merely momentarily depressed to initiate operation of the pump, all of the intermittent squirts of washer fluid delivered by the programmed washer pump assembly are delivered toward the windshield of the vehicle. When the momentary push button switch is held depressed the diverter valve mechanism is operable to direct the intermittent squirts of washer fluid toward the headlamps of the vehicle. If the momentary push button switch is held depressed and then released prior to the washer pump assembly completing its programmed cycle of operation, the diverter valve mechanism is operable to direct the washer fluid toward the headlamps during the time interval the push button switch is depressed and to direct the remaining squirts of washer fluid toward the windshield after the push button is released.

The present invention further resides in various novel constructions and arrangement of parts, and further objects, novel characteristics and advantages of the present invention will be apparent to those skilled in the art to which it relates and from the following detailed description of the illustrated embodiment thereof made with reference to the accompanying drawings forming a part of this specification and in which similar reference numerals or characters are employed to designate corresponding parts throughout the several views, and in which.

Although the washer system of the present invention could be used for selectively supplying washer fluid under pressure to either of any two different transparent surface areas of an automotive vehicle, it is particularly useful for selectively supplying washer fluid under pressure to either a windshield or a plurality of headlamps of an automotive vehicle, and for the purposes of description and illustration it will be herein described and shown as being used for the latter purpose.

Figure 1:
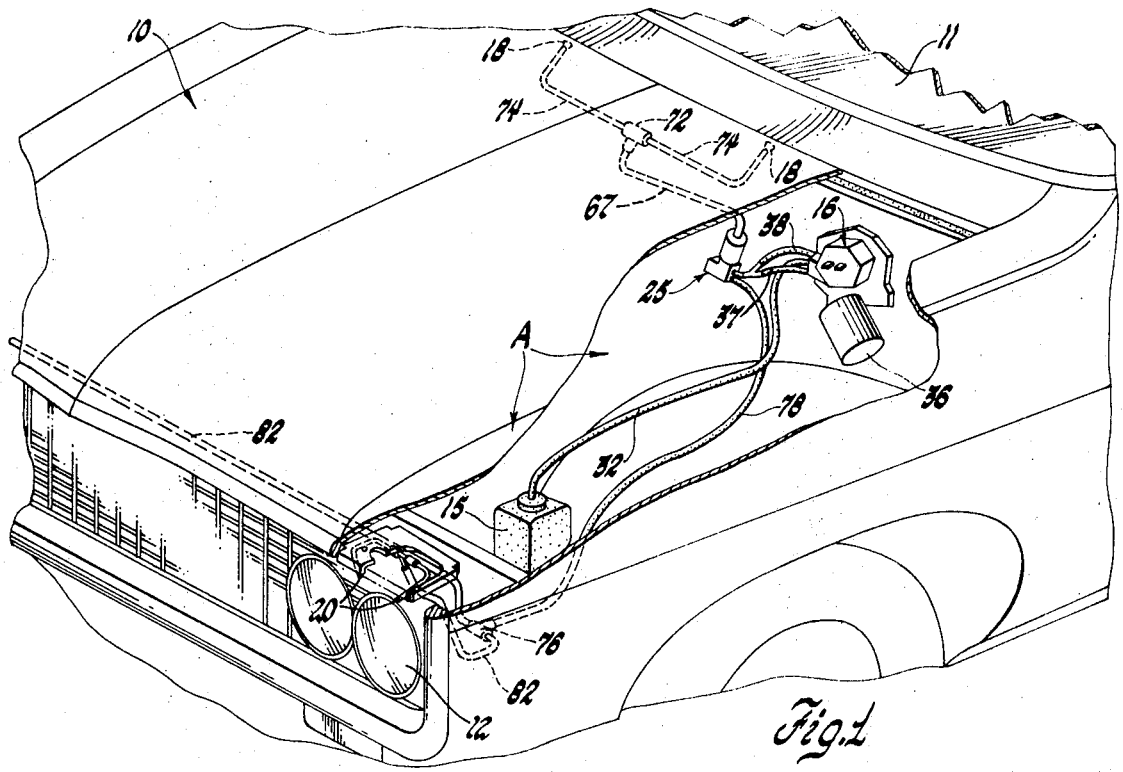
FIG. 1 is a fragmentary perspective view of an automotive vehicle embodying a washer system of the present invention.

Referring to FIG. 1 of the drawings, a windshield and headlamp washer system A is thereshown as being embodied in an automotive vehicle 10. The vehicle 10 includes a windshield 11 supported by its body structure and a plurality of headlamps 12 supported by the body structure at the forward end of the vehicle 10. The washer system A is suitably supported by the vehicle body structure and comprises, in general, a reservoir 15 containing a source of washer fluid or solvent, a washer pump assembly 16 for pumping washer fluid under pressure, a pair of windshield washer nozzles 18 positioned adjacent the windshield 11 at its lower edge, a pair of headlamp washer nozzles 20 positioned adjacent the headlamps 12 and a diverter valve mechanism 25 which is selectively operable to direct the washer fluid being delivered by the pump assembly 16 to either the windshield nozzles 18 or the headlamp nozzles 20 for washing the windshield and headlamps 12, respectively.

Figure 3:
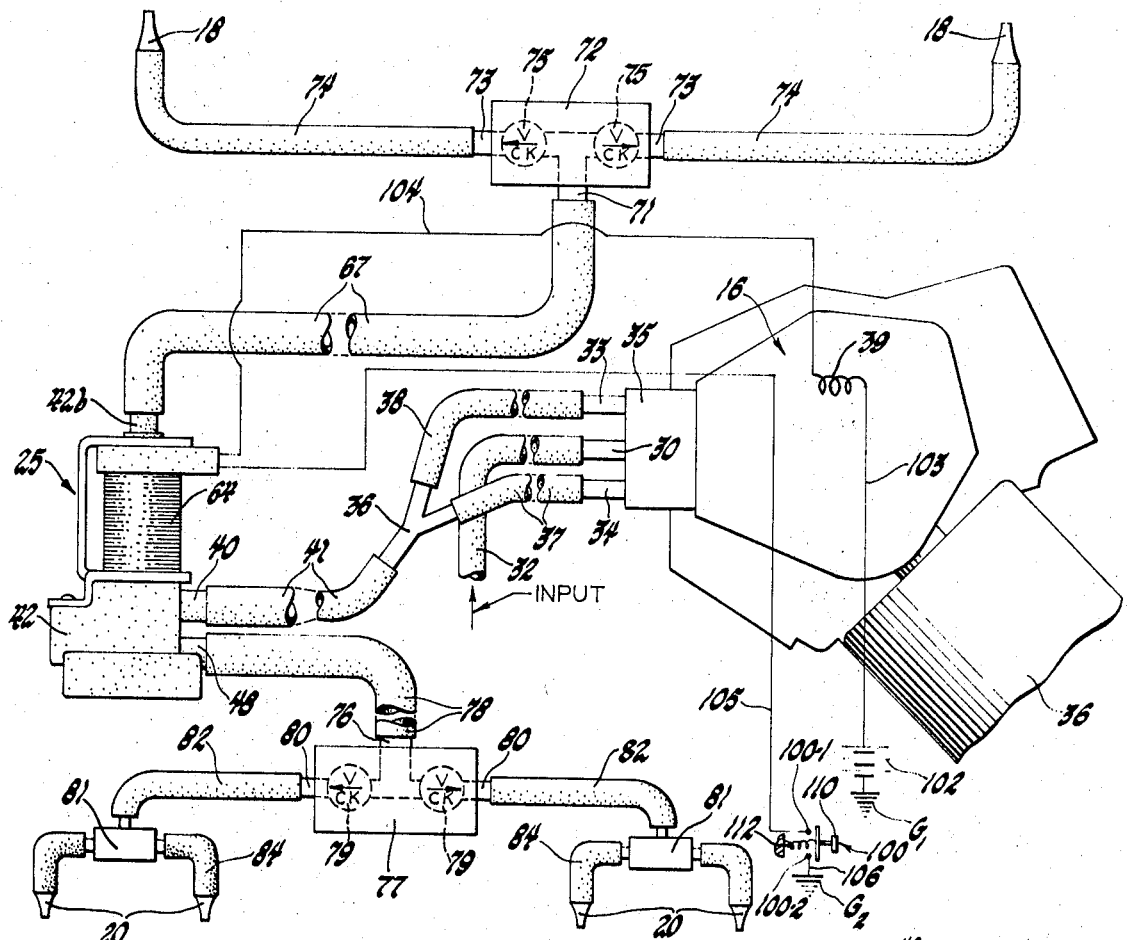
FIG. 3 is a schematic view of the washer system shown in FIG. 1.

As best shown in FIG. 3, the washer pump assembly 16 has an inlet 30 in communication with the reservoir 15 via a flexible conduit 32 and a pair of outlets 33 and 34. Although the washer pump assembly 16 could be of any suitable or conventional construction, it is preferably of the type which has a programmed wash cycle during which it delivers a predetermined number of squirts of washer fluid, such as that shown in application Ser. No. 701,443 filed on Jan. 29, 1968 in the name of Robert F. Romanowski, and assigned to the same assignee as the present invention. Since the washer pump assembly 16 per se does not form a part of the present invention, only its operation, in general, will be described, and resort may be had to the aforementioned copending application for a detailed description of its operation.

The washer pump assembly 16 includes a reciprocable pump 35 having an interruptible driving connection with an electric motor 36 of a wiper unit and which is operable to deliver intermittent squirts of washer fluid when drivingly connected with the motor 36. The washer pump assembly 16 also includes a control and timer mechanism (not shown) which is operable to establish a driving connection between the pump 35 and the wiper unit motor 36 upon momentary energization of a relay coil 39 thereof and which automatically interrupts the driving connection therebetween after a predetermined number of squirts of washer fluid has been pumped. The outlets 33 and 34 of the washer pump assembly 16 are connected to the inlets of a Y connector 36 via flexible conduits 37 and 38, the outlet of the Y connector 36 in turn being connected to an inlet or inlet opening 40 of the diverter valve mechanism 25 via a flexible conduit 41.

Figure 4:
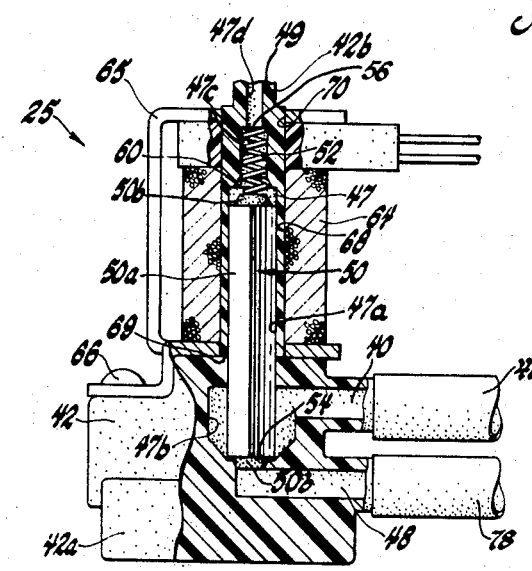
FIG. 4 is an enlarged elevational view, with portions shown in section, of part of the washer system shown in FIG. 3.

The diverter valve mechanism 25, in the preferred embodiment, is a solenoid operated valve and is selectively operable to direct the washer fluid delivered by the pump to either the windshield washer nozzles 18 or the headlamp washer nozzles 20. The diverter valve mechanism 25 could be of any suitable or conventional construction and is shown in FIG. 4 as comprising a plastic valve housing 42 having a main housing portion 42a and an integral tubular portion 42b at its upper end. The valve housing 42 has a central opening 47 therein. The central opening 47 includes a first portion 47a of a given diameter, an enlarged diameter portion 47b adjacent its lower end and which is in communication with the inlet 40 thereof, a smaller diameter portion 47c adjacent its upper end and an outlet diameter portion 47d which has a smaller diameter than the portion 47c. The upper end 49 of the tubular portion 42b of the valve housing 42 defines a first outlet or outlet means and the housing 42 is also provided with a second outlet or outlet means 48 which is in communication with the enlarged diameter portion 47b of the central opening 47.

Communication between the inlet 40 and the outlets 48 and 49 of the diverter valve mechanism 25 is controlled by a reciprocable valve member or armature 50 slidably disposed within the opening 47. The valve member 50, as viewed in FIG. 4, has a polygonally or square shaped metal body 50a and secured to the opposite ends of the metal body 50a are rubber seats 50b. The seats 50b are in the shape of truncated cones. The valve member 50 is normally spring biased by a spring 52 toward a first or normal position in which the lower seat 50b thereof seats against an annular, tapered seat or surface 54 in the valve housing 42 to block communication between the inlet 40 and the outlet 48 and to communicate the inlet 40 with the outlet 49. The washer fluid flows between the polygonally shaped body 50a and the circular opening 47 and around the seat 50b when the valve member 50 is in this position. The spring 52 is a coiled compression spring which has one end in abutting engagement with the upper seat 50b of the valve member 50 and its other end in abutting engagement with a radially extending abutment surface 56 at the juncture of the opening portions 47c and 47d of the central opening 47.

Figure 5:
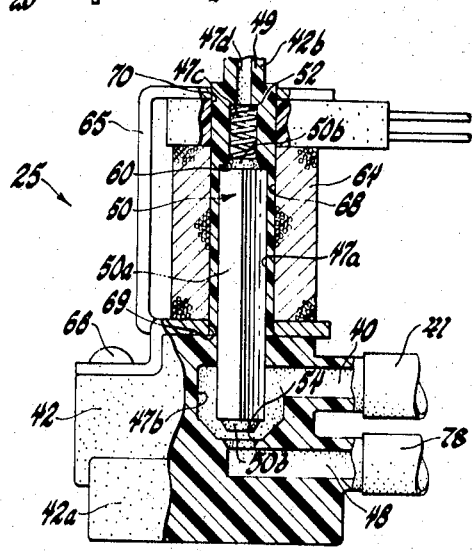
FIG. 5 is a view similar to that shown in FIG. 4, but showing different parts thereof in different positions.

The valve member 50 is adapted to be moved to a second or retracted position, as shown in FIG. 5, in which the upper seat 50b thereof seats against an annular, tapered valve seat or surface 60 formed at the juncture of the opening portions 47a and 47c of the opening 47 in the housing 42 to block communication between the inlet 40 and the outlet 49 and to communicate the inlet 40 with the outlet means 48 in response to energization of a relay coil 64. The relay coil 64 is carried by a metal U-shaped bracket member 65 which is suitably secured to the valve housing portion 42a, as by screws or rivets 66. The relay coil has a central though opening 68 which is aligned with transverse openings 69 and 70 in the legs of the U-shaped bracket to enable the tubular portion 42b of the housing 42 to extend therethrough. The relay coil 64 when energized magnetically draws the metal valve member 50 upwardly toward its retracted position in opposition to the biasing force of the spring 52. The U-shaped bracket member 65 provides a return path for the magnetic flux. The relay coil 64 when deenergized breaks the magnetic field to allow the spring 52 to return the valve member 50 towards its normal position, as shown in FIG. 4.

The outlet 49 of the diverter valve mechanism 25 is connected via flexible conduit 67 to an inlet 71 of a T-shaped connector 72, the outlets 73 of which are respectively in communication with the windshield washer nozzles 18 via flexible conduits 74. The outlets of the T-shaped connector contain check valves 75 which allow the washer solvent to flow therepast from conduit 67 to conduits 74, but prevent reverse flow of fluid therepast.

The outlet means 48 of the diverter valve mechanism 25 is connected to an inlet 76 of a T-shaped connector 77 via a flexible conduit 78. The outlets 80 of the T-shaped connector 77 one respectively in communication with the inlets of T-shaped connectors 81 via flexible conduits 82. The outlets of the T-shaped connector 76 contain check valves 79 which allow washer solvent to flow therepast from conduit 78 to conduits 82, but prevent reverse flow therepast. The outlets of the T-shaped connectors 81 are connected with the headlamp washer nozzles 20 via conduits 84.

Figure 2:
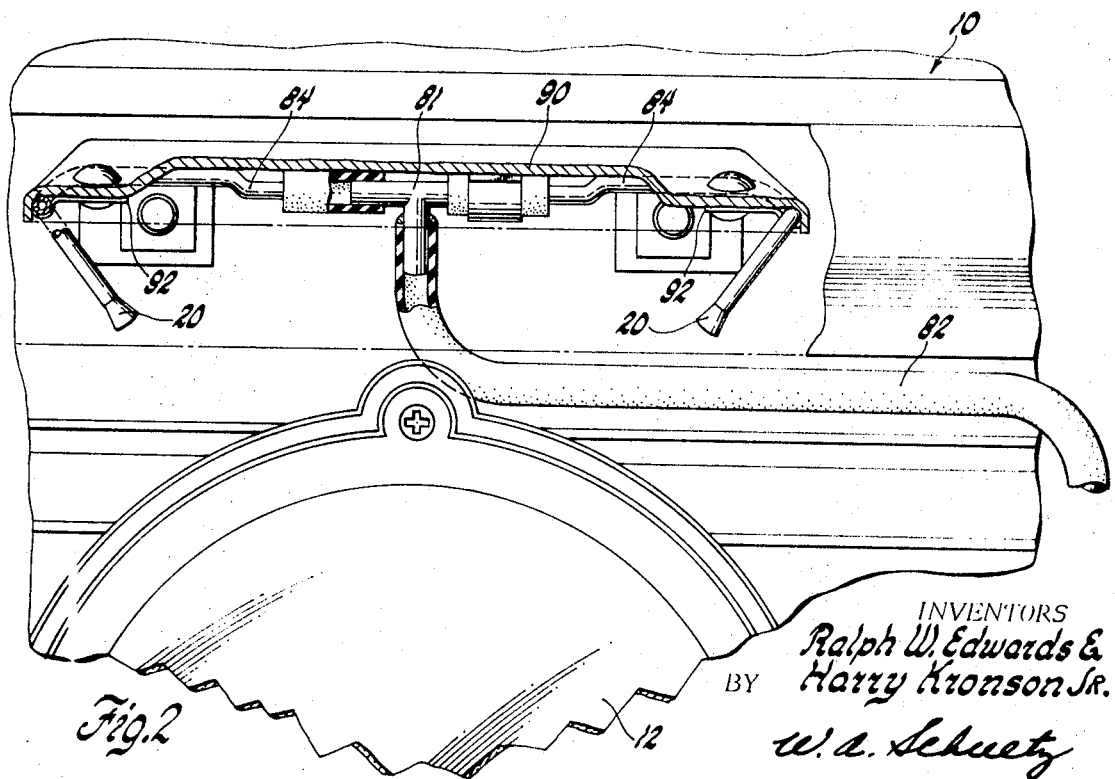
FIG. 2 is an enlarged fragmentary sectional view taken approximately along line 2-2 of FIG. 1.

The headlamp washer nozzles 20 can be of any suitable or conventional construction, but preferably are of the type which emit a high pressure jet stream of washer solvent onto two different areas of the transparent or outer surface of the headlamps 12, as shown in FIGS. 1 and 2. The nozzles 20, in the illustrated embodiment, are positioned only above the outermost or low-beam headlamps and are suitably carried by a bracket means 90 secured to the body structure of the vehicle 10. The T-shaped connectors 81, conduits 84 and headlamp washer nozzles 20 are suitably held in place on the bracket means by clips 92 secured to the bracket means 90.

Although in the illustrated embodiment the headlamp washer nozzles 20 are only used for cleaning the low-beam headlamps 12 of the automotive vehicle 10, it will, of course, be understood that additional nozzles could be provided for also cleaning the innermost or high beam headlights 12 of the automotive vehicle, if desired.

The washer system A also includes a control circuit means including a manually operable push button switch 100 for controlling operation of the washer pump assembly 16 and the diverter valve mechanism 25. The control circuit means includes a battery 102 having one post thereof connected to a suitable ground $G_1$ and its other post connected to one end of the relay coil 37 for initiating operation of the washer pump by a wire conductor 103. The other end of the relay coil 37 is connected to one end of the relay coil 64 by a wire conductor 104, the other end of the relay coil 64 being connected via wire conductor 105 to a stationary switch contact 100-1 of the push button switch 100. The other stationary switch contact 100-2 of the switch 100 is connected via wire 106 to ground $G_2$. The switch 100 also includes a depressible plunger means 110 for bridging contacts 100-1 and 100-2 and which is normally spring biased toward an open position, as shown in FIG. 3, by a spring 112.

In operation, when the operator desires to have washer fluid squirted against the windshield 11 for cleaning the same, he will merely momentarily depress the plunger 110 of the switch 100 to its closed position in which the plunger 110 of the switch 100 to its closed position in which the plunger means thereof bridges the stationary contacts 100-1 and 100-2. When the pushbutton switch 100 is moved to its closed position a circuit is completed from battery 102, wire conductor 103, relay coil 37, wire conductor 104, relay 64, wire conductor 105, stationary switch contact 100-1, plunger 110, stationary contact 100-2, wire conductor 106, to ground $G_2$. The completion of this circuit energizes the relay coil 37 for initiating a programmed cycle of operation of the washer pump assembly 16 and also energizes the relay coil 64 to cause the valve member 50 to be moved from its normal position, as shown in !fig. 4, to its retracted position, as shown in FIG. 5. When the operator releases the plunger 110 of the push button switch 100 after momentarily depressing the same to its closed position, it returns to its open position and the circuit is broken. This, in turn, deenergizes relay coils 37 and 64. Deenergization of the relay coil 37 has no effect, since the pump assembly 16 will operate through its programmed cycle of operation due to its mechanical timer control, as described in the aforementioned patent application. Deenergization of the relay coil 64 will cause the spring 52 to return the valve member 50 from its retracted position, as shown in FIG. 5, toward its normal position, as shown in FIG. 4, in which it communicates the inlet means 40 with the outlet means 49. When the diverter valve mechanism 25 is deenergized the intermittent squirts of washer fluid emitted from the pump 35 will be communicated via conduits 37, 38, Y connector 36, flexible conduit 41 to the inlet means 40 of the diverter valve mechanism 25. The fluid coming into the inlet 40 of the diverter valve mechanism 25 will pass through the outlet means 49 thereof and thence through conduit 67, the inlet 71 of the T-shaped connector 72, past the check valves 75, conduits 74, to the windshield washer nozzles 18, from which the washer solvent is emitted in jet form and directed against the windshield 11.

It should be noted that although the relay coil 64 of the diverter valve mechanism 25 is momentarily energized when the plunger 110 of the pushbutton switch 100 is momentarily depressed, it will not direct the washer fluid toward the headlamps 12, since it will be deenergized and the valve member 50 returned to its normal position prior to the pump beginning to pump any fluid into the inlet means 40 thereof. The washer pump assembly 16, upon being energized, will go through its programmed cycle of operation and automatically shut off.

When the operator desires to direct the washer fluid to the headlamp washer nozzles 20 for cleaning the headlamps 12 of the vehicle 10, he will merely depress the plunger 110 of the pushbutton switch 100 to its closed position and hold it in its closed position. This causes both the relay coil 37 of the pump assembly 16 to be energized to initiate pump operation and the relay coil 64 of the diverter valve mechanism 25 to be energized, which in turn causes the valve member 50 to be moved from its normal position, as shown in FIG. 4, to its retracted position, as shown in FIG. 5, in which it blocks communication between the inlet 40 and outlet 49 and opens communication between the inlet 40 and the outlet 48. When the washer fluid is being diverted from the inlet 40 to the outlet means 48 of the diverter valve mechanism 25 all of the washer fluid will be directed onto the headlamps 12 of the vehicle 10. The washer fluid from the outlet 48 flows through flexible conduit 78, the inlet 76 of T-shaped connector 77, past the check valves 79, conduits 82, T-shaped connectors 81, conduits 84 to headlamp nozzles 20. The washer solvent emanates from the nozzles 20 in jet form and is directed onto the outer surface of the headlamps 12.

Should the operator of the vehicle release the plunger 110 of the pushbutton switch 100 to allow the same to be moved to its open position prior to the pump assembly 16 completing its programmed cycle of operation, the washer fluid emanating from the pump 35 will be automatically diverted toward the windshield of the vehicle during the remaining or latter portion of the pump operation. This is because when the plunger 110 of the pushbutton switch 100 is released, the coil 64 of the diverter valve mechanism 25 is deenergized which causes the valve member 50 to be moved toward its normal position, as shown in FIG. 4, in which it blocks communication between the inlet 40 and the outlet means 48 thereof and opens communication between the inlet 40 and the outlet means 49 thereof, which in turn causes the fluid to be directed toward the windshield washer nozzles 18.

From the foregoing description, it should be apparent that the washer system A of the present invention can be selectively operated so as to direct all of the washer fluid during the programmed cycle of operation of the pump assembly toward the windshield 11, direct all of the washer solvent onto the outer surfaces of the headlamps 12, or enable part of the washer fluid during each cycle of pump operation to be directed against the headlamps 12 and part to be directed against the windshield 11. This system thus, enables an operator of the vehicle to clean both the windshield and the headlamps as conditions necessitate.

Although the illustrated embodiment thereof has been described in great detail, it should be apparent that certain modifications, changes, and adaptations bay be made in the illustrated embodiment, and that it is intended to cover all such modifications, changes and adaptations which come within the spirit of the present invention.

We claim:

1. A washer system for supplying washer fluid under pressure to either first or second transparent surface areas on an automotive vehicle comprising:
   a source of washer fluid;
   a washer pump having an inlet means in communication with said source and an outlet means for supplying washer fluid under pressure when energized;
   a diverter valve mechanism having an inlet means in communication with said outlet means of said washer pump and first and second outlet means;
   first and second nozzle means adapted to be positioned adjacent the first and second transparent surface areas and which are in communication with said first and second outlet means of said diverter valve mechanism, respectively, said diverter valve mechanism including a valve member movable between a first position in which it communicates the inlet means with said first outlet means thereof and a second position in which it communicates said inlet means with said second outlet means thereof and a selectively energizable means for effecting movement of said valve member from its first position toward its second position when energized and movement of said valve member from its second position toward its first position when deenergized, respectively; and
   manually operable control means for selectively energizing and deenergizing said energizable means of said valve mechanism.

2. A washer system for supplying washer fluid under pressure to either a windshield or a plurality of headlamps of an automotive vehicle comprising:
   a source of washer fluid;
   a washer pump having an inlet means in communication with said source and an outlet means for supplying washer fluid under pressure when energized, a diverter valve mechanism having an inlet means in communication with the outlet means of said washer pump and first and second outlet means;
   first and second nozzle means adapted to be positioned adjacent the windshield and headlamps of the vehicle and being in communication with said first and second outlet means of said diverter valve mechanism, respectively, said diverter valve mechanism including a valve member movable between a first position in which it communicates the inlet means with the first outlet means thereof and a second position in which it communicates the inlet means with the second outlet means thereof and energizable means for moving said valve from its first position towards its second position when energized and for effecting movement of the valve member from its second position toward its first position when deenergized, respectively; and
   manually operable control means for selectively energizing and deenergizing said energizable means whereby washer fluid can be selectively directed either against the windshield of the vehicle of the headlamps of the vehicle.

3. In an automotive vehicle having a windshield and a plurality of headlamps, a washer system for supplying washer fluid under pressure to either the windshield or the headlamps of the vehicle, said washer system comprising:
   a source of washer fluid;
   a programmed washer pump having an inlet means in communication with said source and an outlet means and being operable to deliver a predetermined number of squirts of washer fluid when energized;
   a diverter valve mechanism having an inlet means in communication with the outlet means of said washer pump and first and second outlet means;
   first and second nozzle means adapted to be positioned adjacent the windshield and the headlamps of the vehicle and being in communication with said first and second outlet means of said diverter valve mechanism, respectively, said diverter valve mechanism including a solenoid operated valve member having a normal position in which it communicates the inlet means with the first outlet means of the diverter valve mechanism when the first outlet means of the diverter valve mechanism when the solenoid is deenergized but which is movable to a retracted position in which it communicates the inlet means with the second outlet means of the diverter valve mechanism when the solenoid is energized, and switch means in an operative electric circuit with said solenoid and means for initiating operation of said washer pump, said switch means when momentarily depressed and released being operable to initiate operation of the washer pump and cause the predetermined number of squirts of washer fluid delivered thereby to be directed against the windshield of the vehicle and said switch means when held in its closed position causing the squirts of washer fluid to be directed against the headlamps of the vehicle whereby the number of squirts of cleaning fluid directed against the headlamps can be varied.

PO-1050
(5/69)

UNITED STATES PATENT OFFICE
CERTIFICATE OF CORRECTION

Patent No. 3,574,337          Dated April 13, 1971

Inventor(s) Ralph W. Edwards and Harry Kronson, Jr.

It is certified that error appears in the above-identified patent and that said Letters Patent are hereby corrected as shown below:

Column 3, line 65, "one" should read -- are --. Column 4, lines 35 and 36, delete repeated phrase -- 110 of the switch 10 to its closed position in which the plunger --. Column 5, line 58, "bay" should read -- may --. Column 6, lines 66 and 6 delete repeated phrase -- first outlet means of the diverter valve mechanism when the --.

Signed and sealed this 14th day of September 1971.

(SEAL)
Attest:

EDWARD M. FLETCHER, JR.      ROBERT GOTTSCHALK
Attesting Officer             Acting Commissioner of Pa